(12) United States Patent
Yamashita

(10) Patent No.: US 7,208,226 B2
(45) Date of Patent: Apr. 24, 2007

(54) TRANSFER TAPE

(75) Inventor: Masaru Yamashita, Osaka (JP)

(73) Assignee: General Co., Ltd., Osaka-fu (JP)

( * ) Notice: Subject to any disclaimer, the term of this patent is extended or adjusted under 35 U.S.C. 154(b) by 126 days.

(21) Appl. No.: 10/814,718

(22) Filed: Mar. 31, 2004

(65) Prior Publication Data

US 2004/0180196 A1    Sep. 16, 2004

Related U.S. Application Data

(63) Continuation of application No. PCT/JP02/08848, filed on Aug. 30, 2002.

(30) Foreign Application Priority Data

Oct. 1, 2001 (JP) .............................. 2001-305412

(51) Int. Cl.
*B32B 7/12* (2006.01)
*B32B 31/00* (2006.01)
*C09J 7/02* (2006.01)

(52) U.S. Cl. .............................. 428/343; 428/355 AC; 428/354; 428/914; 206/411

(58) Field of Classification Search ................ 428/343, 428/355 AC, 354, 914; 206/411
See application file for complete search history.

(56) References Cited

U.S. PATENT DOCUMENTS

| 2,403,964 A | 7/1946 | Bannon et al. |
| 3,936,571 A | 2/1976 | Van Hoof et al. |
| 4,704,185 A | 11/1987 | Fischer |
| 4,768,427 A | 9/1988 | Cheng |
| 5,430,904 A | 7/1995 | Ono et al. |
| 5,505,306 A | 4/1996 | Akemi et al. |
| 5,685,944 A | 11/1997 | Nose et al. |
| 5,735,999 A | 4/1998 | Mendelovich et al. |
| 5,750,170 A | 5/1998 | Daouse et al. |
| 5,759,341 A | 6/1998 | Kobayashi |
| 5,891,562 A * | 4/1999 | Rutz et al. ............... 428/304.4 |
| 2004/0180196 A1* | 9/2004 | Yamashita .................. 428/343 |
| 2004/0238677 A1 | 12/2004 | Tominaga |

FOREIGN PATENT DOCUMENTS

| JP | S61-066772 | 4/1986 |
| JP | H03-273080 | 12/1991 |
| JP | H 04-046070 | 4/1992 |
| JP | H 05-239413 | 9/1993 |
| JP | H5-311135 | 11/1993 |
| JP | H 06-008362 | 2/1994 |
| JP | H 07-267478 | 10/1995 |
| JP | H 09-001986 | 1/1997 |
| JP | H 09-071097 | 3/1997 |
| JP | 2000-204328 A | 7/2000 |
| JP | 2001-098233 | 4/2001 |
| JP | 2001-192625 | 7/2001 |
| JP | 2001-240812 | 9/2001 |

OTHER PUBLICATIONS

Tominaga, M., "Transfer Tool", U.S. Appl. No. 10/792,343, filed Mar. 3, 2004, 33 Pages.

* cited by examiner

*Primary Examiner*—Daniel Zirker
(74) *Attorney, Agent, or Firm*—Brinks Hofer Gilson & Lione

(57) ABSTRACT

[An object of the present invention is] to provide transfer tape that maintains strong adhesive strength but can be reliably cut at a stipulated position. The adhesive film contains needle-shaped particles. If the adhesive strength is made high, then the adhesion between the adhesive ingredients is increased, thus forming a film that is difficult to cut. If a force is applied to the band-shaped ribbon in a direction outside the plane in which the adhesive coating is applied, then the film of the adhesive coating becomes thin and the needle-shaped particles rupture the film and cut the adhesive film. Moreover, the cut adhesive film draws the cut end to the needle-shaped particles, and as a result it is cut completely without stringiness.

26 Claims, 2 Drawing Sheets

FIG. 1

| | | Sample 1 | Sample 2 | Sample 3 | Sample 4 | Sample 5 | Sample 6 | Comparative Sample 1 | Comparative Sample 2 |
|---|---|---|---|---|---|---|---|---|---|
| Properties of evaluated samples | Amount of particles (parts by weight) | 1.0 | 1.0 | 1.0 | 1.0 | 1.0 | 1.0 | 1.0 | 1.0 |
| | Shape of particles | Needle-like | Needle-like | Needle-like | Needle-like | Needle-like | Needle-like | Spherical | Spherical |
| | Material for particles | Wollastonite | Wollastonite | Wollastonite | Wollastonite | Wollastonite | Wollastonite | Silica | Silica |
| | Particle hardness (Mohs hardness) | 4.5 | 4.5 | 4.5 | 4.5 | 4.5 | 4.5 | | |
| | Average grain size (μm) | 4 | 8 | 13 | 12 | 20 | 40 | 10 | 10 |
| | Average particle length (μm) | 12 | 40 | 78 | 264 | 360 | 640 | 10 | 10 |
| | Particle content (wt.%) | 2.2 | 2.2 | 2.2 | 2.2 | 2.2 | 2.2 | 2.2 | 2.2 |
| | Coating thickness (μm) | 20 | 20 | 20 | 20 | 20 | 20 | 20 | 13 |
| Evaluation results | Ease of coating | 5 | 5 | 5 | 5 | 4 | 3 | 5 | 5 |
| | Ease of cutting Test A | 2 | 3 | 4 | 4 | 4 | 4 | 1 | 3 |
| | Adhesive strength | 5 | 5 | 5 | 5 | 5 | 5 | 5 | 1 |
| | Overall evaluation | △ (12) | ○ (13) | ◎ (14) | ◎ (14) | ○ (13) | △ (12) | × (11) | × (9) |
| Parameters | Parameter 1 | ○ | ○ | ○ | ○ | ○ | ○ | × | × |
| | Parameter 2 | × | × | × | × | × | × | × | × |
| | Parameter 3 | × | △ (lower) | ○ | ○ | △ (upper) | × | × | × |
| | Parameter 4 | ○ | ○ | ○ | ○ | ○ | ○ | × | × |

FIG. 2

| | | Sample 4 | Sample 7 | Sample 8 | Sample 9 | Sample 10 | Sample 11 |
|---|---|---|---|---|---|---|---|
| Properties of evaluated samples | Amount of particles (parts by weight) | 1.0 | 1.0 | 0.3 | 0.5 | 0.4 | 1.7 |
| | Shape of particles | Needle-like | Needle-like | Needle-like | Needle-like | Needle-like | Needle-like |
| | Material for particles | Wollastonite | Glass | Glass | Glass | Glass | Glass |
| | Particle hardness (Mohs hardness) | 4.5 | 6.5 | 6.5 | 6.5 | 6.5 | 6.5 |
| | Average grain size (μm) | 12 | 10 | 10 | 10 | 10 | 10 |
| | Average particle length (μm) | 264 | 348 | 348 | 348 | 348 | 348 |
| | Particle content (wt.%) | 2.2 | 2.2 | 0.7 | 1.1 | 3.0 | 3.6 |
| | Coating thickness (μm) | 20 | 20 | 20 | 20 | 20 | 20 |
| Evaluation results | Ease of coating | 5 | 5 | 5 | 5 | 5 | 5 |
| | Ease of cutting Test B | 2 | 5 | 3 | 4 | 5 | 5 |
| | Adhesive strength | 5 | 5 | 5 | 5 | 4 | 3 |
| | Overall evaluation | △ (12) | ◎ (15) | ○ (13) | ◎ (14) | ◎ (14) | ○ (13) |
| Parameters | Parameter 1 | ○ | ○ | ○ | ○ | ○ | ○ |
| | Parameter 2 | × | ○ | ○ | ○ | ○ | ○ |
| | Parameter 3 | ○ | ○ | ○ | ○ | ○ | ○ |
| | Parameter 4 | ○ | ○ | × | △ (lower) | △ (upper) | × |

TRANSFER TAPE

RELATED APPLICATIONS

This application is a continuation application of International Application PCT/JP02/08848, that has an international filing date of Aug. 30, 2002, claiming priority under § 365(b) to Japanese Application 2001-305412 filed on Oct. 1, 2001. This continuation application fully incorporates the above applications by reference and further claims priority to the Japanese Application 2001-305412 filing date of Oct. 1, 2001 under § 119(a)–(d).

BACKGROUND

1. Technical Field

The present invention relates to transfer tape that has an adhesive film formed by coating a band-shaped ribbon with an adhesive film transfers the adhesive film from the band-shaped ribbon to a targeted object, thereby adhering the targeted object to another adhering object by means of the adhesive film transferred to said targeted object, and more particularly to transfer tape that maintains strong adhesive strength but can be reliably cut at a stipulated position.

2. Technical Background

A transfer tool using transfer tape that has an adhesive film formed by coating a band-shaped ribbon with an adhesive film transfers the adhesive film from the band-shaped ribbon to a targeted object, thereby adhering the targeted object to another adhering object by means of the adhesive film transferred to said targeted object. This type of transfer tool is provided with: a supply spool around which is wound the unused transfer tape; a take-up spool that takes up the band-shaped ribbon after the adhesive film is transferred; and a dispenser that is provided in an intermediate location upon the transport path between the supply spool and take-up spool and exposed to the outside.

A transfer tool of the constitution described above is used by pressing the dispenser onto the targeted object, moving the entire tool in this state, thereby transferring the adhesive film onto the targeted object and separating the transfer tool (entire tool) from the targeted object at a desired location. The adhesive film upon the band-shaped ribbon is thus cut at the dispenser onto the side on the targeted object and the side on the transfer tape.

In this operation of the transfer tool, in recent years the ease of cutting the adhesive film is considered important from the standpoint of ease of use. To wit, the adhesive film adheres the targeted object to the other adhering object so naturally it has adhesive strength. But if this adhesive strength is too high, the adhesive film cannot be easily cut when one attempts to cut it at the desired location, but rather it is stretched out in strings between the side of the targeted object and the side of the band-shaped ribbon (this phenomenon shall hereinafter be referred to as "stringiness").

When this stringiness occurs, in the case that the terminus of the stringiness is present on the side of the targeted object, for example, dumpling-like lumps may occur when the terminuses of the stringiness are concentrated on the targeted object, or a step may occur in the state of adhesion between the targeted object and the adhering object, or gaps may occur so that good adhesion is not achieved. On the other hand, in the same manner, in the case that the terminus of the stringiness is present on the side of the band-shaped ribbon, for example, when it is used next, the dumpling-like lumps may be transferred to the targeted object or there may be occasional cases in which the transfer of the adhesive film cannot be started from the desired position. Moreover, there is a risk of the adhesive film adhering to the dispenser itself and having deleterious effects on its operation.

To solve this problem and prevent the stringiness as described above from occurring, JP-A 2000-98233 proposes providing a plurality of protrusions on the adhesive film side of the band-shaped ribbon such that they protrude in both width directions of said band-shaped ribbon, so that these protrusions make the adhesive film partially thinner. In addition, JP-A 2001-192625 proposes a pressure-sensitive transfer type adhesive tape wherein the adhesive film is disposed upon the band-shaped ribbon in a state in which it is cut to units of a stipulated size.

However, even if these proposals suppress stringiness, the adhesive film can only be cut at the positions of the predetermined protrusions or to the units of a stipulated size, so it cannot be cut at the desired positions (of size or length). In addition, there are problems in that this increases cost due to the- difficulty of manufacturing special band-shaped ribbon, and the need for facilities for coating the band-shaped ribbon with a coating cut into stipulated units.

In order to allow the adhesive film to be easily cut at the desired positions while suppressing stringiness easily and at low cost, in the past, JP-B 6-62920 proposed adhesive transfer tape wherein alginic acid is finely dispersed within an aqueous dispersal solution of the adhesive, thereby weakening the membranous character of the adhesive film and allowing it to be cut easily. In addition, JP-A 2001-240812, for example, proposes pressure-sensitive transfer adhesive tape wherein: the adhesive film contains a filler, the equation (thickness of the adhesive film)/(filler grain size)=0.6–8.0 is true, and the thickness of the adhesive film is 5–200 µm.

However, in the ones containing filler proposed in the aforementioned JP-A 2001-240812, the filler is spherical so the effect of allowing the film of the adhesive film cannot be reliably obtained, so there is a problem in that the cutting effect may not be obtained depending on the film thickness. In addition, there is also a problem in that, while the amount of filler can be easily increased or the thickness of the adhesive film can be easily made thinner, the adhesive strength conversely decreases.

In addition, with the adhesive transfer tape proposed in JP-B 6-62920, the membranous character of the adhesive film is weakened so it is easily cut, its adhesive strength may be extremely reduced due to inadequate dispersion of the alginic acid, or it may be cut at unnecessary locations, so the cutting effect cannot be reliably obtained over the entire adhesive film.

The present invention came about in order to solve the aforementioned problems and has as its object to provide transfer tape that maintains strong adhesive strength but can be reliably cut at a stipulated position.

SUMMARY OF THE INVENTION

The present invention came about based on the following reasons.

To wit, the conventional fillers had as their object to weaken (disrupt) the viscosity among the principal components of the adhesive film (membranous character of the adhesive film), and thereby lower the overall adhesive strength and simplify its cutting. Accordingly, the conventional filler had been spherical (cutting due to the filler had not been noted), so as a result the adhesive strength had been lowered at the same time that cutting is simplified.

The present invention differs from the prior art in that it does not lower the overall adhesive strength, but rather when increasing the viscosity among the main components of the adhesive film and strengthening the overall adhesive strength, it actively improves the cutting of the film of the adhesive film. As a result, the adhesive film contains needle-shaped or preferably steeple-shaped (a shape with a sharpened end) particles.

In addition, the needle-shaped particles in this Application are defined to be preferably steeple-shaped as described above. But they may also be pillar-shaped in which the ratio of the maximum grain diameter to the length of the particle is 1:3 or more to give it a rod-like shape, if not spherical, and the particles shaped as such preferably constitute 90% or more of all of the particles.

As a result, the following effect occurs. When the adhesive strength is increased, the viscosity among the adhesive components is high as described above, so a film that is not easily cut is formed. But because it contains needle-shaped particles, when a force is applied in a direction other than the direction of the plane along which the band-shaped ribbon is coated with the adhesive film, the film of the adhesive film becomes thinner and then the needle-shaped particles rupture the film, thereby cutting the adhesive film. Then, the cut edge of the adhesive film is pulled to the needle-shaped particles, resulting in the film being cut completely without stringiness at the cut edges.

In passing, appropriate materials to be included in the adhesive film as the needle-shaped particles include, for example, glass, wollastonite, sepiolite, chrysotile, aluminum borate whiskers, titanium oxide whiskers and potassium titanate whiskers.

An adhesive film with its adhesive strength increased in this manner is readily transferred from the band-shaped ribbon to the targeted object and strongly adheres the targeted object to the other adhering object. Moreover, by moving the transfer tape in a direction other than in a horizontal plane with respect to the targeted object at the desired position, the needle-shaped particles rupture the film of the adhesive film and reliably cut the adhesive film.

In addition, in the present invention, the needle-shaped particles as described above also have a Mohs hardness of 6 or greater. The Mohs hardness is one scale for indicating the hardness of a substance, with 10 numbers defined from the softest mineral to the hardest which is diamond. The positions of various minerals are determined on a scale of one to 10 depending on which of the standard minerals they are first scratched by. Informally also called the scratch hardness, the Mohs hardness indicates not the absolute value of the hardness but rather the relative hardness when compared in order. The hardness of the standard minerals are diamond: 10, corundum: 9, topaz: 8, quartz: 7, feldspar: 6, apatite: 5, fluorite: 4, calcite: 3, gypsum: 2 and talc: 1.

Here, the reason why the Mohs hardness of the needle-shaped particles is set to 6 or greater is that if the Mohs hardness is softer than 6, the needle shape is readily broken at the stage of including the needle-shaped particles into the main components of the adhesive film to manufacture the final transfer tape. Moreover, by including needle-shaped particles with a Mohs hardness of 6 or greater, the film of the adhesive film can be more readily ruptured and the adhesive film can be readily cut.

In passing, materials that have a Mohs hardness of 6 or greater include, for example, glass, titanium oxide whiskers, and aluminum borate whiskers. By using them, the meritorious effects described above can be more reliably obtained without the needle shape being broken in the process of manufacturing the transfer tape.

In addition, with the constitution described above, the present invention sets the maximum grain diameter size of the needle-shaped particles to 5–30 µm and the length of the particles to 30–500 µm. The reason for this is that, if the maximum grain diameter is smaller than 5 µm and the particle length is shorter than 30 µm, then the tendency not to contribute to the ease of cutting the adhesive film becomes stronger. If the maximum grain diameter of the needle-shaped particles is larger than 30 µm and the particle length is longer than 500 µm, then the tendency for the needle-shaped particles to become caught in the smoother of the gravure coater or the Meyer bar of the kiss coater, thereby causing streaks in the coating and deleteriously affecting the quality of coating becomes stronger.

In addition, with the constitution described above, the present invention sets the needle-shaped particle content ratio of the adhesive film composition to 1.0–3.0 wt. %. The reason for this is that, if the needle-shaped particle content is lower than 1.0 wt. %, then cases in which the ease of cutting cannot be maintained stable arise, but if higher than 3.0 wt. %, then cases in which the adhesive strength decreases may arise.

Note that the following materials may be used as the constituent ingredients of the adhesive film other than the needle-shaped particles. The adhesive used may be acrylic-based, rubber-based or silicone-based, for example. Moreover, if necessary, a rosin-based, terpene-based or other tackifier may also be used. In addition, it is possible to use a colorant such as Phthalocyanine Blue, Phthalocyanine Green, Brilliant Carmine 6B, Permanent Yellow H10G, Lake Red, or another organic pigment which is good from the standpoint of the clarity and fastness of color. In addition, a cissing preventative agent or preservative and the like may be included.

The material used for the band-shaped ribbon may be polyethylene terephthalate, polyethylene, polypropylene, polyvinyl chloride or other plastic film, or glassine paper or the like. In addition, depending on the case, either one or both sides of the band-shaped ribbon may be treated with a mold-release agent such as a silicone resin or fluororesin.

Note that the thickness of the band-shaped ribbon is preferably 5–60 µm and particularly preferably 15–55 µm. The reason for this is that if it is thinner than 5 µm, the transfer tape is susceptible to wrinkling or kinking which may cause malfunctioning. On the other hand, if it is thicker than 60 µm, then it is difficult to include longer lengths within the limited space within the transfer tool, the materials cost increases, and it may become resistant to bending, thus causing feed or transfer malfunctions.

Moreover, the thickness to which the band-shaped ribbon is coated with the adhesive film is preferably 15–30 µm. The reason for this is that if it is thinner than 15 µm, then cases of reduced adhesive strength may occur, but if thicker than 30 µm, then cases in which the ease of cutting cannot be maintained stably may occur. Note that the band-shaped ribbon may be coated with the adhesive film using a kiss coater, gravure coater, comma coater or by other method.

A transfer tape according to the present invention is used in a transfer tool which is provided with: a supply spool around which is wound the unused transfer tape; a take-up spool that takes up the band-shaped ribbon after the adhesive film is transferred; and a dispenser that is provided in an intermediate location upon the transport path between the supply spool and take-up spool and exposed to the outside.

The transfer tool is used by pressing the dispenser onto the targeted object, moving the entire tool in this state, thereby transferring the adhesive film onto the targeted object and separating the transfer tool (entire tool) from the targeted object at a desired location. The adhesive film upon the band-shaped ribbon is thus cut at the dispenser by a cutting action of the needle-shaped particles onto the side on the targeted object and the side on the transfer tape.

BRIEF EXPLANATION OF THE DRAWINGS

FIG. 1 is a table showing the values of the parameters employed in the Samples and Comparative Samples, along with evaluations from various tests and overall evaluations.

FIG. 2 is a table showing the values of the parameters employed in the Samples, along with evaluations from various tests and overall evaluations.

DETAILED DESCRIPTION

Here follows a description of the meritorious effects of the present invention made with reference to FIG. 1 and FIG. 2. In the following, Samples 1–11 are tapes wherein the present invention is adopted, with FIG. 1 and FIG. 2 illustrating the correspondence between the various Samples and the values of the parameters employed in the present invention. In addition, the Comparative Samples are tapes wherein the present invention is not adopted. Moreover, Samples 1–7 and Comparative Samples 1 and 2 adopt a uniform 1.0 parts by weight as the amount of needle-shaped particles and spherical particles. The values of the other parameters are presented in FIG. 1 and FIG. 2.

The adhesive coating used in the tests had the following composition:
   a. Needle-shaped or spherical particles: 1.0 parts by weight (Samples 1–7 and Comparative Samples 1 and 2)
   b. Emulsion-type acrylic adhesive: 37.0 parts by weight (parts by weight when converted to solids)
   c. Rosin-based tackifier: 4.5 parts by weight (parts by weight when converted to solids)
   d. Phthalocyanine Blue colorant: 1.5 parts by weight
   e. Cissing preventative agent: 2.5 parts by weight
   f. Water: 53.5 parts by weight Note that in Samples 8–11, only the parts by weight of the needle-shaped or spherical particles was varied as illustrated in FIG. 2, while the other constituent ingredients were kept as the same parts by weight in the formula above.

Here follows a description of the tests performed in order to confirm the meritorious effects.

(Ease of Coating)

At the time of manufacture of the transfer tape, a 25 μm polyethylene terephthalate film (band-shaped ribbon) treated with mold-release agent on both sides was coated with an adhesive film according to the various Samples described above using a kiss coater to achieve various coating depths. The appearance of the coated surface was evaluated at that time, using the following scale:
   5: Absolutely no problems from an appearance standpoint.
   4: Nearly no problems from an appearance standpoint.
   3: A small amount of cosmetic streaking (but no problems in use).
   2: A noticeable amount of cosmetic streaking (but no problems in use).
   1: Marked streaking thought to be due to needle-shaped or spherical particles becoming caught on the Meyer bar of the kiss coater occurred, also causing problems in use.

(Ease of Cutting: Test A)

A transfer tool with a width of 8.4 mm was used to transfer 10 cm of the adhesive film to high-quality paper (the targeted object) and then the transfer tool was moved in the direction of operation of the transfer tool as is while being lifted at an angle of 30° with respect to the targeted object to cut the adhesive film. This test was performed 10 times on each of the Samples, and the number of times stringiness occurred was evaluated using the following scale:
   5: Stringiness did not occur.
   4: Stringiness of less than 1 mm occurred 1–2 times.
   3: Stringiness of less than 1 mm occurred 3–4 times.
   2: Stringiness of 1 mm or more occurred 1–3 times.
   1: Stringiness of 1 mm or more occurred 4 or more times.

(Ease of Cutting: Test B)

A transfer tool with a width of 8.4 mm was used to transfer 10 cm of the adhesive film to high-quality paper (the target object) and then the transfer tool was lifted as is at an angle of 90° with respect to the target object to cut the adhesive film. This test was performed 10 times on each of the Samples, and the number of times stringiness occurred was evaluated, using the following scale:
   5: Stringiness did not occur.
   4: Stringiness of less than 1 mm occurred 1–2 times.
   3: Stringiness of less than 1 mm occurred 3–4 times.
   2: Stringiness of 1 mm or more occurred 1–3 times.
   1: Stringiness of 1 mm or more occurred 4 or more times.

(Adhesive Strength)

A transfer tool with a width of 8.4 mm was used to transfer 10 cm of the adhesive film to high-quality paper (the target object) which was then adhered to high-quality paper of the same quality as the targeted object. A 2-kg roller was rolled back and forth twice to adhere the two and after 3 minutes elapsed, the adhered object was peeled off. The state of the adhered surface of the adhered object was evaluated, using the following scale:
   5: Entire surface ripped.
   4: 70% to less than 100% of the entire adhered surface ripped.
   3: 50% to less than 70% of the entire adhered surface ripped.
   2: Less than 50% of the entire adhered surface ripped. Or the adhered surface became fuzzy.
   1: Unchanged from before adhesion.

FIG. 1 presents a comparison of Samples 1–6, wherein the adhesive film contains the needle-shaped particles at between about 1.0 wt. % and about 3.0 wt. % in the constituent ingredients of the adhesive film, while varying the maximum grain diameters between about 5 μm and about 30 μm and the grain lengths between about 30 μm and 500 μm, against Comparative Samples 1 and 2, while illustrating the results of evaluation (with Test A for ease of cutting) and the correspondence with the values of the parameters employed in the present invention. Note that the overall evaluation is indicated by the symbols ⊙, ○, Δ and × in order from best to worst, where the numbers in parentheses indicate the totals of the scale numbers given above. In addition, on the parameter rows, wherein: parameter 1 denotes the adhesive film contains needle-shaped particles; parameter 2 denotes that the Mohs hardness of the needle-shaped particles is 6 or greater; parameter 3 denotes that maximum grain diameter of the needle-shaped particles is 5–30 μm and their grain length is 30–500 μm; and parameter 4 denotes that the needle-shaped particle content is 1.0–3.0 wt. %, ○ indicates that a Sample employs the parameter for parameter 1 or that the value falls within the stipulated parameter range for each of parameters 2, 3 and 4, Δ indicates that the value falls within the stipulated range, but the value is closer to the upper or lower limit of the parameter than the center of the range, while × indicates no employment of parameter 1 or that the value falls outside the stipulated range for each of parameters 2, 3 and 4.

Here follows a description of the results of various Samples in FIG. 1 along with the reasons.

Comparative Sample 1 had an overall evaluation of × (11). The reason why is because the particles were spherical in shape, the evaluation of ease of cutting Test A was poor.

Comparative Sample 2 had an overall evaluation of × (9). The reason why is because the thickness of coating the adhesive film was made thinner than in Comparative Sample 1, so the evaluation of ease of cutting Test A was improved over that of Comparative Sample 1, but the evaluation of adhesive strength was worse.

Sample 1 had an overall evaluation of Δ (12). The reason why is because wollastonite with a Mohs hardness of 4.5 was used for the needle-shaped particles, and the maximum grain size and particle length of the needle-shaped particles (hereinafter called the "particle dimensions") was outside the lower limits, so the evaluation of ease of cutting Test A was low. However, needle-shaped particles were used, so the results were better overall than those of Comparative Samples 1 and 2.

Sample 2 had an overall evaluation of ○ (13) so the results were better than those of Sample 1. The reason why is because, although the Mohs hardness was outside the lower limit, the particle dimensions were the lower limit values within the range, so the evaluation of ease of cutting Test A was improved. In addition, needle-shaped particles were used, so the results were better overall than those of Comparative Samples 1 and 2.

Samples 3 and 4 had overall evaluations of ◎ (14) so the results were the best of all of the Samples shown in FIG. 1. The reason why is because, although the Mohs hardness was outside the lower limit, the particle dimensions were within the range, so the evaluation of ease of cutting Test A was improved.

Sample 5 had an overall evaluation of ○ (13) so the results were slightly worse than those of Samples 3 and 4. The reason why is because the particle dimensions were values near the upper limits within the range, so the evaluation of ease of coating was slightly lower in comparison to Samples 3 and 4. In addition, needle-shaped particles were used, so the results were better overall than those of Comparative Samples 1 and 2.

Sample 6 had an overall evaluation of Δ (12) so the results were slightly worse than those of Samples 3 and 4. The reason why is because the particle dimensions exceeded the upper limits, so the evaluation of ease of coating was lower in comparison to Samples 3 and 4. In addition, needle-shaped particles were used, so the results were better overall than those of Comparative Samples 1 and 2.

An overall summary of the various Samples presented in FIG. 1 was given above, where Samples 1–6 which contained needle-shaped particles gave results that were better overall than those of Comparative Samples 1 and 2 which did not adopt the present invention at all. Moreover, in Samples 1–6, it was found that the overall evaluation was increased when the maximum grain diameter of the needle-shaped particles is 5–30 μm and the grain length of the particles is 30–500 μm.

FIG. 2 presents the results of evaluation (with Test B for ease of cutting) of Sample 4 which had the best overall results in FIG. 1 and Samples 7–11 wherein the adhesive film contains the needle-shaped particles whose Mohs hardness was 6 or greater, maximum grain diameters were between about 5 μm and about 30 μm, and grain lengths were between about 30 μm and 500 μm, while varying their content ratio at between about 1.0 wt. % and about 3.0 wt. % in the constituent ingredients of the adhesive film. Accordingly, in Samples 8–11 among Samples 7–11, the amount of needle-shaped particles was varied to the values of 0.3, 0.5, 1.4 and 1.7 parts by weight, thus varying the content ratio. Note that the overall evaluation is indicated by the symbols ◎, ○, Δ and × in order from best to worst, where the numbers in parentheses indicate the totals of the scale numbers given above. The parameter rows show the evaluation results of the Samples evaluated, using the same evaluation methods used in FIG. 1.

Here follows a description of the results of various Samples in FIG. 2 along with the reasons.

Sample 4 had an overall evaluation of Δ (12). The reason why is because the Mohs hardness was outside the lower limit, so the evaluation of ease of cutting Test B was poor. Note that in the following, the evaluation of relative superiority is indicated based on Sample 4 in FIG. 2 as the reference, but all exhibited results better than Comparative Samples 1 and 2 shown in FIG. 1.

Sample 7 had an overall evaluation of ◎ (15) so the results were the best of all of the Samples shown in FIG. 1 or FIG 2. The reason why is because the requirement of a Mohs hardness of 6 or greater was satisfied, so the evaluation of ease of cutting Test B was improved in comparison to Sample 4, and also all of the stipulations of the present invention were satisfied.

Sample 8 had an overall evaluation of ○ (13) so the results were worse than those of Sample 7 but better than those of Sample 4. The reason why is because the particle content ratio was outside the lower limit, so the evaluation of ease of cutting Test B was low.

Sample 9 had an overall evaluation of ◎ (14) so the results were slightly worse than those of Sample 7 but better than those of Sample 8. The reason why is because the particle content ratio was at the lower limit within the range, so the evaluation of ease of cutting Test B was improved over that of Sample 8.

Sample 10 had an overall evaluation of ◎ (14) so the results were slightly worse than those of Sample 7 but roughly the same as those of Sample 9. The reason why is because the particle content ratio was at the upper limit within the range, so the evaluation of ease of cutting Test B was improved over that of Sample 9 but the adhesive strength was lower than that of Sample 9.

Sample 11 had an overall evaluation of ○ (13) so the results were worse than those of Sample 7 but better than those of Sample 4. The reason why is because the particle content ratio exceeded the upper limit, so the adhesive strength was low.

An overall summary of the various Samples presented in FIG. 2 was given above, where Samples 7–11, wherein the adhesive film contained the needle-shaped particles whose Mohs harness was 6 or greater, maximum grain diameters were between about 5 μm and about 30 μm, and grain lengths were between about 30 μm and 500 μm, while varying their content ratio at between about 1.0 wt. % and about 3.0 wt. % in the constituent ingredients of the adhesive film, gave results that were better overall than those of Sample 4, wherein the Mohs hardness of the contained particles was less than 6. Samples 7–11, in which a Mohs hardness of 6 or greater were used, exhibited need results regarding the ease of cutting. Also, Samples 7, 9 and 10 exhibited good results compared against Samples 8 and 11 because Samples 7, 9 and 10 contained the needle-shaped particles at a content ratio of 1.0–3.0 wt. %, particularly.

As described above, the transfer tape according to the present invention has an adhesive film that contains needle-shaped particles, whose Mohs hardness is 6 or greater, at a content ratio of 1.0–3.0 wt. %, so it maintains strong adhesive strength but the adhesive film can be reliably cut at a stipulated position without generating stringiness. Moreover, even if the adhesive strength is increased, by adopting needle-shaped particles with a maximum grain diameter of 5–30 µm and a particle length of 30–500 µm, the aforementioned meritorious effects can be obtained and also they become even more marked.

I claim:

1. A transfer tape comprising:
   a band-shaped ribbon that is continuous and pressable along a length onto a targeted object;
   an adhesive film coated on the band-shaped ribbon, wherein the adhesive film has a thickness of between 15 µm and 30 µm and is transferable from the band-shaped ribbon onto the targeted object when the band-shaped ribbon is pressed onto the targeted object along the length; and
   particles contained in the adhesive film whose content ratio is about 1.0–3.0 wt %, wherein the particles have a diameter-length ratio of 1:3 or greater, a maximum grain diameter of about 5–30 µm and a particle length of about 30–500 µm, and wherein after the length of adhesive film has been transferred onto the targeted object, the particles facilitate cutting of the adhesive film near an end of the transferred length when the adhesive film is pulled away from the targeted object.

2. A transfer tape according to claim 1, wherein the particles have a Mohs hardness of about 6 or greater.

3. A transfer tape according to claim 1, wherein the particles have at least one sharpened end.

4. A transfer tape according to claim 3, wherein the particles are in the shape of a needle.

5. A transfer tape according to claim 3, wherein the particles are in the shape of a steeple.

6. A transfer tape according to claim 1, wherein some of the particles are in the shape of a rod.

7. A transfer tape according to claim 6, wherein the rod-shaped particles constitute 90% or more of all the particles contained in the adhesive film.

8. A transfer tape according to claim 1, wherein the particles comprise a material selected from a group consisting of glass, wollastonite, sepiolite, chrysotile, aluminum borate whiskers, titanium oxide whiskers and potassium titanate whiskers.

9. A transfer tape according to claim 1, wherein the adhesive film comprises an adhesive selected from a group consisting of an acrylic-based adhesive, a rubber-based adhesive and a silicone-based adhesive.

10. A transfer tape according to claim 1, wherein the band-shaped ribbon comprises a material selected from a group consisting of polyethylene terephthalate, polyethylene, polypropylene and polyvinyl chloride.

11. A transfer tape according to claim 1, wherein the band-shaped ribbon is treated with a release agent on at least one side thereof.

12. A transfer tape according to claim 1, wherein the band-shaped ribbon has a thickness of between about 5 µm and about 60 µm.

13. A transfer tape according to claim 12, wherein the band-shaped ribbon has a thickness of between about 15 µm and about 55 µm.

14. A transfer tool comprising:
   a band-shaped ribbon that is continuous and pressable along a length onto a targeted object;
   an adhesive film coated on the band-shaped ribbon, wherein the adhesive film has a thickness of between 15 µm and 30 µm and is transferable from the band-shaped ribbon onto the target object when the band-shaped ribbon is pressed onto the target object along the length;
   a dispenser that, in use of the transfer tool, is brought onto the targeted object, slid thereon for the length and brought off the targeted object, wherein the band-shaped ribbon travels at the dispenser as the dispenser slides on the targeted object, for thereby transferring the adhesive film along the length from the band-shaped ribbon on the targeted object; and
   particles contained in the adhesive film whose content ratio is about 1.0–3.0 wt %, wherein the particles have a diameter-length ratio of 1:3 or greater, a maximum grain diameter of about 5–30 µm and a particle length of about 30–500 µm, and wherein, after the length of adhesive film has been transferred onto the targeted object, the particles facilitate cutting of the adhesive film near an end of the transferred length when the transfer tape is pulled away from the targeted object by the dispenser being brought off the targeted object.

15. A transfer tool according to claim 14, wherein the particles have a Mohs hardness of about 6 or greater.

16. A transfer tool according to claim 14, wherein the particles have at least one sharpened end.

17. A transfer tool according to claim 16, wherein the particles are in the shape of a needle.

18. A transfer tool according to claim 16, wherein the particles are in the shape of a steeple.

19. A transfer tool according to claim 14, wherein some of the particles in the shape of a rod.

20. A transfer tool according to claim 19, wherein the rod-shaped particles constitute 90% or more of all the particles contained in the adhesive film.

21. A transfer tool according to claim 14, wherein the particles comprise a material selected from a group consisting of glass, wollastonite, sepiolite, chrysotile, aluminum borate whiskers, titanium oxide whiskers and potassium titanate whiskers.

22. A transfer tool according to claim 14, wherein the adhesive film comprises an adhesive selected from a group consisting of an acrylic-based adhesive, a rubber-based adhesive and a silicone-based adhesive.

23. A transfer tool according to claim 14, wherein the band-shaped ribbon comprises a material selected from a group consisting of polyethylene terephthalate, polyethylene, polypropylene and polyvinyl chloride.

24. A transfer tool according to claim 14, wherein the band-shaped ribbon is treated with a release agent on at least one side thereof.

25. A transfer tool according to claim 14, wherein the band-shaped ribbon has a thickness of between about 5 µm and about 60 µm.

26. A transfer tool according to claim 25, wherein the band-shaped ribbon has a thickness of between about 15 µm and about 55 µm.

* * * * *